United States Patent Office 2,890,124
Patented June 9, 1959

2,890,124

MODIFICATION OF WAXES AND PRODUCTS THEREFROM

Franklin E. Mange, University City, Mo., assignor to Petrolite Corporation, Wilmington, Del., a corporation of Delaware No Drawing. Application October 1, 1956
Serial No. 612,945

88 Claims. (Cl. 106—23)

The present invention has two main aspects. This invention relates to the modification of and the resultants produced from a solvent extracted oxidized microcrystalline wax. Such modification involves the solvent extraction of oxidized microcrystalline wax, followed by the reaction of the harder higher melting fraction with an organic compound containing, as the sole reacting groups, a plurality of separate and distinct groups having the formula $-X=C=Y$, wherein X is a member of the class consisting of —C and N, and Y is a member of the class consisting of O, S, and NR where R is a member of the class consisting of hydrogen and monovalent hydrocarbon radicals. The preferred class of the above reactants are the isocyanates and more specifically the polyisocyanates with particular reference to the diisocyanates.

The resultant waxes so produced according to this invention show great superiority to either oxidized microcrystalline wax or solvent extracted oxidized microcrystalline wax and they also show an unpredictable enhanced value over the resultant waxes produced in accordance with my co-pending application, Serial No. 612,946, filed October 1, 1956, due to the solvent extraction step. Also, it has been found that trace quantities of water which are in general essential to the resultants produced according to the method in the above-mentioned application do not seem to be as important in this invention. The reactions in this case oftentimes can be conducted with or without trace quantities of externally added water with no apparent differences in the nature of the product.

This invention has as a main object a method for making waxes having the properties of the hard natural waxes, as exemplified by carnauba wax, ouricury wax, candelilla wax, etc. from cheap and readily available materials. In the past, no synthetic wax and, particularly, one derived from microcrystalline wax, has exhibited a combination of the desirable properties which characterize the hard natural waxes.

This invention has as another main object the utilization of such resultants for use in carbon paper inks and, more specifically, for use in one-time carbon paper inks.

A concise statement as to certain problems involved in the compounding of carbon transfer inks is made in U.S. Patent No. 2,426,248, dated August 26, 1947, to Sugarman. For purpose of brevity the second paragraph as it appears in the specification of said patent is quoted verbatim herewith:

"In compounding carbon transfer inks, wherein waxes and oils are incorporated with pigment or dye stuffs, such as carbon black, it has been recognized that the presence of certain waxes is necessary to impart a degree of dispersion and fluidity to the mixture. These were generally carnauba, ouricury and reed waxes. However, certain vegetable waxes of considerable commercial importance, of which candelilla wax is one example, were found to lack sufficient dispersive powers possessed by the other waxes previously mentioned. It was also known that mineral waxes, such as paraffin, ozokerite and analogous waxes, possessed little or no dispersive powers whatever."

Said aforementioned U.S. Patent No. 2,426,248 proceeds to describe in detail the manufacture of carbon transfer inks, the step of intermixing an oxidized vegetable wax, which contains fatty acids of chain lengths of from 20 to 30 carbon atoms, into carbon black, in a low viscosity petroleum oil, producing an increase in the dispersion of the carbon black therein and an increase in the fluidity of the product, affording a fluid dispersion.

The products of reactions so obtained have many other uses. They may serve as complete replacements for the hard natural waxes now available such as carnauba wax and ouricury wax. It has long been the object to produce economically a wax having the desirable characteristics of waxes such as carnauba and ouricury from cheap and readily available raw materials. The waxes produced according to this invention serve as replacements for these hard natural waxes in most of their applications and they may be used for blending with or otherwise modifying the character of other available waxes.

These waxes are particularly adapted for certain uses where, as far as is known, there has not been any equally satisfactory synthetic wax composition. For instance, reference is made to the use of a coating for single use carbon paper. The products of this invention are also particularly useful in the making of various polishes, such as emulsion, paste, or cream floor polishes, automobile polishes, furniture polishes, etc. They may be used as an additive to lubricants, as an additive to rust inhibiting compounds, etc. In these instances the compounds function for some reason other than their wax-like character.

The preparation of oxidized microcrystalline waxes or similar wax mixtures is well-known and has been described extensively in the literature, particularly in the patent literature. The art of solvent extracting an oxidized wax likewise has been described in the patent literature.

The reaction involving diisocyanates or other reactants of the kind hereinafter described with solvent extracted oxidized microcrystalline wax or oxidized wax mixtures in a general way is conducted in the same manner that diisocyanates have been reacted with other suitable reactants including reactants in which the chemical compounds have one or more functional groups. (See, for example, Chemical Reviews, 43, 203–218 (1948).)

In summary then, the present invention in its broadest aspect includes the new products or compositions so obtained; the method of preparing the same; the utilization of such resultants in carbon paper inks; and the application in a wide number of arts, including the art where wax or waxes are employed.

For purpose of convenience what is said hereinafter will be divided into five parts.

Part 1 is concerned with suitable organic compounds which contain, as the sole reacting groups, a plurality of separate and distinct groups having the formula $-X=C=Y$, wherein X is a member of the class consisting of —C and N and Y is a member of the class consisting of O, S, and NR where R is a member of the class consisting of hydrogen and monovalent hydrocarbon radicals.

For convenience, Part 1 is subdivided into two sections; Section A is concerned with a broad class of reactants and Section B is concerned with the preferred diisocyanates.

Part 2 is concerned with suitable solvent extracted oxidized microcrystalline waxes. This part is to be divided into three sections; Section A is concerned with the microcrystalline waxes which can be used; Section B is concerned with the oxidation of the microcrystalline waxes, and Section C describes the solvent extraction of the oxidized microcrystalline waxes.

Part 3 is concerned with the method, or process which reacts the two classes of materials above noted so as to produce the desired end product or resultant.

Part 4 is concerned with uses for the products in carbon paper inks derived in the manner described in Part 3 preceding.

Part 5 is concerned with other uses or industrial application of such products of reaction or cogeneric mixtures or either as such or in combination with other well-known waxes. These uses include, for example, the manufacture of various polishes with particular reference to furniture polish or floor polish and the like.

PART 1

Section A

Broadly speaking, the materials which can be reacted with solvent extracted oxidized microcrystalline wax for the purpose of this invention are the organic compounds, containing as the sole reacting group a plurality of separate and distinct groups having the formula —X=C=Y, wherein X is —C or N and Y is O, S, or NR wherein R is hydrogen or a monovalent hydrocarbon radical. See above-mentioned U.S. Patent No. 2,430,479, dated November 11, 1947, to Burt Carlton Pratt et al.

A preferred subgenus of this invention is that wherein the active hydrogen containing solvent extracted oxidized microcrystalline wax is reacted with a compound having a plurality of —N=C=Z groups, wherein Z is a chalcogen (J. Am. Chem. Soc., 63, 892 (1941)) of atomic weight less than 33. This subgenus includes the polyisocyanates, the polyisothiocyanates and mixed isocyanate-isothiocyanates having at least one of each of these groups. For convenience of disclosure, the invention will be discussed below largely in terms of the polyisocyanates.

The preferred diisocyanates, diisothiocyanates and mixed isocyanate-isothiocyanates have the general formula ZCN—R—NCZ in which R is a divalent hydrocarbon radical and Z is a chalcogen of atomic weight less than 33.

Examples of other types of —X=C=Y compounds which may be used include carbon suboxide $C_3O_2$, carbon subsulfide $C_3S_2$, diethylenediketene

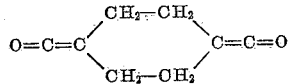

and compounds of formulae:

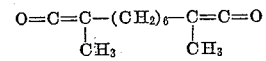

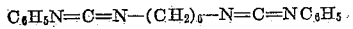

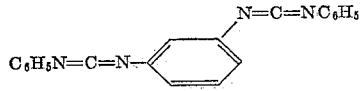

and

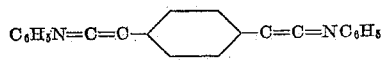

Of the organic compounds described by the above formulae, the most useful, because of their greater availability, reactivity, ease of manufacture, and cost, are the isocyanates or the thioisocyanates, or combinations of these two.

Section B

A preferred subgenus of this invention is that wherein the above partial structural formulae represents the polyisocyanate and more specifically the diisocyanates, which of course contain two distinct and separate isocyanate groups. Representative compounds of this subgenus are the polymethylene diisocyanates such as ethylene diisocyanate, trimethylene diisocyanate, tetramethylene diisocyanate, pentamethylene diisocyanate, etc.; the alkylene diisocyanates such as propylene-1,2-diisocyanate, butylene-1,2-diisocyanate, butylene 1,3-diisocyanate, butylene-2,3-diisocyanate; the alkylidine diisocyanates such as ethylidene diisocyanate, butylidene diisocyanate, and heptylidene diisocyanate. The cycloalkylene diisocyanates such as cyclopentylene-1,3-diisocyanate, cyclohexylene-1,2-diisocyanate, cyclohexylene-1,4-diisocyanate; the aromatic diisocyanates such as m-phenylene diisocyanate, p-phenylene diisocyanate, 1-methylphenylene-2,4-diisocyanate, 1-methylphenylene-2,6-diisocyanate, 3,3'-bitolylene-4,4'-diisocyanate, naphthylene-1,4-diisocyanate, naphthylene-1,5-diisocyanate; aliphatic-aromatic diisocyanates such as xylylene-1,4-diisocyanate, xylylene-1,3-diisocyanate, 4,4'-diphenylenemethane diisocyanate, 4,4'-diphenylenepropane diisocyanate, etc.

The diisocyanates of the types listed in the above paragraph are the ones which are most preferred for purposes of this invention. Examples of compounds containing more than two reactive groups of formula —X=C=Y and of the preferred subgenus —N=C=O which can be used, there may be mentioned 1,2,4-benzene triisocyanate and butane-1,2,2-triisocyanate.

Of course, it should be remembered that the polyisothiocyanates may be used instead of the polyisocyanates and representative examples would be those given above with the single change that the oxygen atom is substituted by sulfur.

PART 2

Section A

The microcrystalline wax which is used for the purpose of this invention is tank bottom derived microcrystalline wax although other waxes or blends or waxes having similar chemical and physical characteristics could be used, for example, certain Fischer-Tropsch waxes, or the hard brittle wax fraction obtainable from lubricating oil manufacture or from petrolatums.

The collection of tank bottom settlings from which these waxes are derived is conducted principally in the middle western oil fields such as in Kansas, Oklahoma, Louisiana and Texas, as well as elsewhere to a lesser degree. A preferred source of bottoms is that obtainable from the East Texas oil fields. The production of microcrystalline wax from tank bottoms is well known and has been described in the literature. (See, for example, U.S. Patent No. 2,443,840, dated June 22, 1948, to Stossel.) These waxes are currently being produced by at least two companies and have a melting point ranging from about 170° F. to 200° F. They contain essentially long chained normal and branched paraffins containing from 35 to 100 carbon atoms per molecule with perhaps some naphthenic type compounds. They will normally have an average molecular weight from approximately 600 up to about 1000. They range in color from white to dark brown, but it is preferred to oxidize a wax having a pale yellow color for economical reasons and for ease of oxidation.

The crude tank bottoms can be refined to yield wax by several methods. One desirable process involves first dehydrating the raw bottoms to remove water. The dehydrated bottoms are then subjected to a vacuum distillation to remove the lighter fractions on up through paraffin wax. The topped dehydrated residue is then solvent extracted with liquid propane to remove the insoluble asphalt and the wax fraction therefrom is then fractionated with a methylethyl ketone-benzol mixture to remove heavy oils. By regulating the temperature of crystallization in the deoiling step, waxes can be obtained having a range of melting points, hardness and molecular weights. The final waxes can then be bleached to the desired color by a percolation process or by using a contact bleaching process.

The resulting waxes have melting points from 170° to 200° F., penetrations of from 10 to 2 and colors from black to white. Tank bottom derived microcrystalline waxes, in general, are susceptible to oxidation by conventional methods; however, those derived from certain fields, particularly from West Texas, will not oxidize by these conventional methods, even though their physical characteristics are similar to other tank bottom derived microcrystalline waxes from other fields. This difference is probably due to the high sulfur content in the West Texas waxes. These waxes can be made susceptible to oxidation by a treatment with a material such as aluminum chloride; thus, several percent of aluminum chloride can be added to the wax and the mixture heated with agitation for several hours. The aluminum chloride and other precipitated material is then removed by filtration although sometimes it is necessary to add a clay to facilitate complete removal of the insoluble material. After this treatment, these waxes which are now oxidation susceptible are useful and acceptable for purposes of this invention.

The next section will describe the oxidation of tank bottom derived oxidation-susceptible microcrystalline waxes.

Section B

The art of oxidizing hydrocarbon waxes is well known and has been extensively discussed in the literature. Microcrystalline waxes and a variety of comparable compounds principally paraffinic in nature have been subjected to oxidation in various manners and particularly by the use of air, ozone, or oxygen in the presence of an oxidation catalyst, such as a wax soluble organic salt such as manganese or cobalt naphthenate. Other ways of oxidizing microcrystalline waxes involve the use of materials such as the oxides of nitrogen and various chemical oxidizing agents such as chromic acid, hypochlorous acid, nitric acid, etc. Also, waxes of this type can be subjected to very mild forms of oxidation such as cracking and the cracked products may be subjected to oxidation by such methods as the Oxo process, or other types of oxidations to introduce oxygen-containing functional groups such as carboxylic acids, alcohols, esters, etc.

For convenience, and for reasons of economy, it is preferred to carry out the oxidation by blowing with an oxygen containing gas at temperatures ranging from 240° to 340° F. for a sufficient length of time to give an appreciable acid and saponification number. This oxidation is preferably carried out in the presence of a catalyst such as a soluble cobalt or a manganese soap; such as a stearate, oleate, naphthenate, etc. Also, wax insoluble catalysts may be used such as potassium permanganate. These catalysts are used in concentrations ranging from 0.2% to 2%. Sometimes, no catalyst is required, especially if the microcrystalline wax is pretreated with a metal halide such as aluminum chloride, or if the oxidation is catalyzed by previously oxidized wax. Sometimes it may be of some advantage to add a chlorinated paraffin or a blown drying oil before or during the oxidation.

This oxidation procedure can be carried out in manners described in numerous patents, such as U.S. Patent No. 2,249,708, dated July 15, 1941, to Hicks-Bruun; U.S. Patent No. 2,486,454, dated November 1, 1949, to Zellner; U.S. Patent No. 2,573,422, dated October 30, 1941, to Fish; and U.S. Patent No. 2,674,613, dated April 6, 1954, to Nelson. Also, the three-part article entitled "Oxidation of Paraffins," by Ernest Stossel in The Oil and Gas Journal, vol. 44, No. 11, pp. 130-9; No. 15, pp. 145-51; No. 17, pp. 69-77 (1945) should be especially noted and also the 121 references in this article.

In general, it is preferred to oxidize the microcrystalline wax to a degree such that the oxidized wax will have an acid number of from 15 to 60 and a saponification number of from 45 to 150. A more preferred range for the acid number is from 20 to 40 and for the saponification number from 50 to 100.

Following are examples which show to a certain extent how an oxidized microcrystalline wax may be produced.

Example 1a

To 300 grams of microcrystalline wax obtained from the settlings of East Texas crude, having a melting point of 190° F. and a penetration of 3 is added 1.5 grams of manganese naphthenate. This resultant mixture is blown with air at a rate of 5 ml./g./min. at 320° F. until the product has an acid number of 10. The temperature is then lowered to 270° and air blowing is continued until the product shows an acid number of 22. By the use of a screen disperser, the time required for this oxidation is thirty hours and the product shows a saponification number of 59 and a penetration of 6 and a melting point of 184° F. (ASTM Test Method D-127-30). All penetration values listed in this invention unless otherwise noted are determined by the ASTM Test Method D5-25 using a 100 g. total weight for five seconds at 77° F. and the penetration is measured in tenths of a millimeter.

Example 2a

To 300 grams of microcrystalline wax obtained from the settlings of East Texas crude, having a melting point of 190° F. and a penetration of 3 is added 1.5 grams of cobalt naphthenate. This resultant mixture is blown with air at a rate of 5 ml./g./min. at 320° F. until the product has an acid number of 10. The temperature is then lowered to 270° and air blowing is continued until the product shows an acid number of 33. By the use of a screen disperser, the time required for this oxidation is fifty hours and the product shows a saponification number of 80, a penetration of 8, and a melting point of 184° F. (ASTM Test Method D127-30).

Example 3a

To 300 grams of a microcrystalline wax obtained from the settlings of East Texas crude, having a melting point of 185° F., a penetration of 4 (ASTM Test Method D5-25) and a light yellow color is added 1.5 grams of cobalt stearate. The resultant mixture is blown with air at a rate of 10 ml./g./min. until the product shows an acid number of 33. This oxidation is carried out by a rapid oxidation at 280° F. and takes about 10-15 hours. The rate of oxidation can be varied by varying the degree of dispersion of the air or by using a mechanical stirrer or by using a rapid air rate as employed in the example. This product has a saponification number of 69 (cf. Example 2a), a penetration of 10 and a melting point of 186° F. (ASTM Test Method D127-30).

These oxidations can be continued for even a longer period of time to give products having acid numbers up to 60 and saponification numbers up to 150. These products are useful for the purpose of this invention. Higher temperatures may be used for this oxidation; however, the products in the invention will then be a little softer and darker in color.

Furthermore, dark colored microcrystalline wax or waxes bleached to a white color may be used or microcrystalline waxes with different melting points, etc. Also, lower air rates may be used, but in this case a greater degree of polymerization is encountered, and in certain instances, if this is carried to excess, very viscous products may be obtained by further reaction as described in Part 3. Air rates may be increased up to 15 ml./g./min. or even higher to achieve faster oxidation or the air dispersion may be increased by use of mechanical stirring, or by using a disperser which gives very fine gas bubbles.

By these latter procedures, good products may be obtained for the purposes of this invention. Many other modifications in the method of oxidation may be made as suggested in the patent literature.

Section C

The oxidized microcrystalline waxes described in Section B can be extracted by numerous solvents to give products which may then be reacted with compounds of the type described in Part 1 of this invention to yield valuable products. The waxes described in the examples of Part 2, Section B may be used or any of countless others produced by similar means from any of a number of different grades of tank bottom derived microcrystalline wax as described in Part 2, Section A. The art of solvent extracting an oxidized wax is well known in the art and has been described in the patent literature, see for example, U.S. Patent No. 1,823,983, dated September 22, 1931, to Luther et al.; U.S. Patent No. 1,863,004, dated June 14, 1932, to Burwell; U.S. Patent No. 1,909,295, dated May 16, 1933, to Luther et al.; U.S. Patent No. 2,424,671, dated July 29, 1947, to Stossel; and U.S. Patent No. 2,698,336, dated December 28, 1954, to Nelson, etc.

In general, the solvent extraction procedure can be conducted by first dissolving the oxidized wax in a suitable solvent at some temperature below or at the boiling point of the solvent. This homogeneous mixture is then cooled to a temperature at which the oxidized wax is only partially soluble and the precipitated wax can then be removed by a filtration process. The precipitated wax, if so desired, can be washed on the filter with additional solvent or may be repulped with clean solvent, preferably at the temperature of filtration, and then refiltered.

For sake of convenience, it is advantageous to choose a solvent which dissolves the wax at a temperature of around 130°–200° F. and one that will yield a good fractionation at temperatures between 50°–100° F. In general, it is most convenient to filter the wax at room temperature, i.e., approximately 70°–95° F. It is also important to choose a solvent which yields a wax precipitate which can be readily recovered by filtration. Oftentimes, the rate of cooling in addition to the nature of the solvent will have an effect upon the ease of filtration of the wax precipitate.

By this general procedure the wax is divided into two fractions; one fraction being of greater hardness, higher melting point, and, in general, having a lower saponification number. For the purposes of this invention, this represents the desirable fraction. The second fraction is softer, has a lower melting point and, in general, has a higher saponification number and is not as useful for the purposes of this invention. A given solvent is chosen so that under a given set of experimental conditions a yield of the solvent insoluble precipitated oxidized wax of from 50 to 75 percent is obtained.

It is often noted, especially in waxes which have been oxidized to a greater extent, that the wax is not completely dissolved in certain solvents; for example, hexane, at elevated temperatures, but rather gives a mixture which appears hazy or cloudy. This is presumably due to the presence of hydroxy acids and, if desirable, this cloudy mixture can be filtered to remove these hydroxy acids. Generally, it has been found that when this insolubility occurs there appears to be only a small amount of this type of material formed in the oxidation, for example, less than several percent. It is not necessary to remove these compounds, for these materials do not seem, at least in these small concentrations, to add or detract qualities in the final product.

In carrying out the extraction process it has been found that, in dissolving the wax in the solvent at elevated temperatures, it is easier to add the molten wax into the solvent with agitation. If all the wax does not go into solution at the particular temperature, the wax is finely divided and will be more readily dissolved than adding solid chunks of wax. This latter procedure is most advantageous when a solvent is used having a boiling point below the melting point of the oxidized wax.

For the sake of convenience, it is best to use approximately 4 to 15 parts by volume of solvent to one part of wax, although higher or lower percentages for example, a ratio of solvent to oxidized microcrystalline wax within the range of 20:1 to 4:1 by volume, can also advantageously be used. In choosing the solvent, it is most convenient to use one having a boiling point less than 300° F. but above 130° F. although solvents outside this range can be used.

When a hydrocarbon solvent is used the two fractions so obtained have acid and saponification numbers which are more nearly alike than those obtained when more polar solvents such as alcohols, esters, ketones, etc. are used. When these latter solvents are used they will preferentially dissolve the oxygenated material in the wax to yield a soft fraction which has a considerably higher saponification number than that obtained by use of the hydrocarbon solvents. Therefore, it is best, but not necessary, to use an oxidized wax which has been oxidized to a greater extent when they are extracted with a polar solvent.

Numerous solvents, or a mixture of solvents, may be used for the purposes of this invention. The important criteria for a solvent are that it be essentially nonreactive with the oxidized microcrystalline wax and that it dissolves the wax at an elevated temperature and then allow wax to be precipitated from it in cooling so that approximately one-fourth to one-half of the wax remain in solution. Yields of precipitated insoluble wax of less than 50 percent can be obtained and useful products may be produced from these but the process is then less economical, and for this reason it is preferred to stay within the cited range. Among those solvents which can be used are the low boiling hydrocarbons such as pentane, hexane, heptane, octane, cyclohexane, petroleum ether, naphtha, benzene, toluene, etc.; the lower boiling alcohols such as ethanol, propanol, butanol, etc.; the lower ketones such as acetone, methylethyl ketone, methylisobutyl ketone, cyclohexanone, etc.; the lower esters such as methyl acetate, ethyl acetate, etc.; chlorinated hydrocarbons such as chloroform, carbon tetrachloride, ethylene dichloride, ethers such as ethyl ether, isopropyl ether, etc.; acids such as acetic acid, propionic acid, etc.; and other materials such as dimethyl formamide, dimethyl sulfoxide, pyridine, etc.

One skilled in the art could name other solvents which would be satisfactory for purposes of this invention and the above list should not be construed to limit the scope of this process. The following examples will describe more specifically the solvent extraction of oxidized microcrystalline waxes.

Example 1b

To three liters of isopropyl alcohol at 50° C. is added with rapid agitation 300 g. of an oxidized wax prepared as described in Example 1a. The wax is added at 100° C. and the resultant mixture is heated to 80° C. and then allowed to cool with stirring to room temperature (90° F.). The precipitated wax is removed by filtration and the wax cake is washed with one liter of fresh solvent at 90° F. After air drying, a 71% yield of wax is obtained having a penetration of 4, a saponification number of 45, and an acid number of 14.

Example 2b

When the same general procedure described in Example 1b is used with the substitution of acetone for isopropyl alcohol, a 72% yield of wax is obtained having a penetration of 3+, a saponification number of 48 and an acid number of 14.

Example 3b

To three liters of ethyl acetate at 60° C. is added with rapid agitation 300 g. of an oxidized wax prepared as described in Example 2a. The wax is added in the molten state at a temperature of 100° C. The resultant mixture is heated to approximately 75° C. and then rapidly cooled with stirring to 80° F. The precipitated wax is removed by filtration and the wax cake washed with one liter of fresh solvent at 80° F. After air drying, a 74% yield of ethyl acetate insoluble wax is obtained having a penetration of 3+, an acid number of 14 and a saponification number of 40. The ethyl acetate solution is evaporated to dryness to give a 26% yield of an ethyl acetate soluble material having an acid number of 76 and a saponification number of 136. This latter material is very soft.

Example 4b

When the same general procedure described in Example 3b is used in which n-hexane in a 6-to-1 ratio rather than ethyl acetate in a 10-to-1 ratio and a filtration temperature of 77° F., a 66% yield of hexane insoluble fraction is obtained having a melting point of 190° F. (ASTM Test Method D127-30), a penetration of 3, an acid number of 18, and a saponification number of 63. From the mother liquor is obtained a hexane soluble fraction in a 34% yield which has a melting point of 154° F. (ASTM Test Method D127-30), a penetration of 51, an acid number of 27 and a saponification number of 92.

Example 5b

When 300 g. of the oxidized wax product of Example 3a is solvent extracted with 1.2 liters of n-hexane (a 4-to-1 ratio), using the general procedure described in Example 3b, a yield of 65% of hexane insoluble wax is obtained having a melting point of 190° F. (ASTM Test Method D127-30), a penetration of 4, an acid number of 24 and a saponification number of 52. A 35% yield of hexane soluble wax is obtained having a melting point of 153° F. (ASTM Test Method D127-30), a penetration of 37, an acid number of 41 and a saponification number of 84.

It is observed from the specifications of the solvent soluble and insoluble fractions in the above examples that the acid and saponification numbers are lower than would be expected on a theoretical basis. The exact reason for this is not known but it is possible that some of the lower acids and esters are lost, probably in the step where the solvent is removed from the solvent soluble fraction.

PART 3

As has been mentioned before, when the organic compounds of Part 1, or a combination of organic compounds of Part 1 are reacted with the products of Section C of Part 2, or a combination of products from Section C of Part 2, very useful products may be obtained.

The nature of the product is determined to a large extent by various reaction variables. The percent and type of diisocyanate is of imporance. The word dissocyanate is being used in this section for the sake of convenience and it should be remembered that, in general, all types of organic compounds may be used as described in Part 1 of this invention. Also, the degree of oxidation of the wax, the reaction time and the reaction temperature, all have an effect on the product. The amount of water in the wax may also have an effect on the nature of the product although it has been found in certain instances that the external addition of water to the reaction mixture seems to have no noticeable effect on the product. In this latter case, water, at least in small quantities (less than 0.3%), seems to neither help nor hinder the reaction. Each of these variables will be described in greater detail later.

The products prepared in this invention were tested for one or more properties and these will be outlined now for sake of clarity in the understanding of the effect of the reaction variables. The acid number of the product is determined in the standard way as has been described in the literature. The results are reported in milligrams of potassium hydroxide per gram of sample. The melting point of the product is the continental solid point as described in Holde and Mueller, "Examination of Hydrocarbon Oils and Saponifiable Fats and Waxes," 2nd ed., New York, John Wiley & Sons, 1922. The penetration is determined by ASTM Test Method D5-25, using a 100-gram total weight for five seconds at 77° F. and the results are reported in tenths of a millimeter.

The ability of a wax to disperse carbon is determined by the following carbon dispersion test; a mixture containing 1.0-2.5 g. (4-10%) of wax on test and 20.5-19.0 g. (82-76%) of a 100 SUS viscosity mineral oil at 100° C. as exemplified by Texaco Ink Oil #538 is heated with stirring at 95-100° C. in a 500 ml. round bottom flask until a solution is obtained. To this solution is added 3.5 g. (14%) of a channel black such as exemplified by Kosmos 40 (United Carbon Co.) and approximately 20 g. of 3 mm. diameter glass beads. The mixture is then stirred at 95-100° C. for 30 minutes, using a stirrer which scrapes the side of the flask. A drop of the ink is placed on an absorption cell. This cell is fitted into a slide and through it a glycerol-water solution is circulated at 95° C. The sample is covered with a cover glass which is pressed with a tweezers and then veiwed under a microscope at ×200. The inks are then classified as being types A, B, C, or D (type A describing the best dispersion) as described in the paper on the "Rheology of Carbon Paper Inks," by E. S. Gale and B. J. Staneslow, from the American Ink Maker of December 1950.

The oil retention penetration, which is a measure of the hardness of a wax-oil blend, is determined as follows: 25 grams of wax on test and 25 g. of a 100 SUS viscosity mineral oil as exemplified by Texaco Ink Oil #538 are placed in a 150 ml. beaker which is covered by a watch glass and placed in an oven at 100° C. for two hours. The sample, after stirring with a glass rod, is then poured into an aluminum foil dish (Fisher Scientific Co., Cat. No. 8-732), resting on asbestos and is covered by a 600 ml. beaker. After being allowed to stand for one hour, the sample is transferred to a water bath at 25.0°±0.2° C. and kept there for 3-4 hours. A penetration is then taken on the sample with a standard ASTM needle under a total load of 100 g. for 5 seconds, and the results are reported in tenths of a millimeter (see ASTM Test Method D5-25).

The oil retention of the ability of a wax to hold oil in a wax-oil blend is determined by placing the wax-oil mold from the preceding test on a piece of filter paper after allowing the sample to remain at room temperature for one hour. A second piece of filter paper is placed on top of the wax-oil mold, and on top of this is placed a 100 gram distributed weight having the same cross-sectional dimensions as the wax mold. After one hour at room temperature, the bottom piece of filter paper is examined visually for oil bleed. If only a trace of oil is noticed, i.e., a ring of oil or a broken ring, having a thickness of less than a millimeter, it is classified as Type 1. If a ring is noted having a thickness of from one to five millimeters, it is classified as Type 2; if a ring of thickness from five to ten millimeters is observed, it is classified as Type 3; if the ring thickness is from 10 to 20 millimeters wide, it is classified as Type 4; and anything greater is classified as Type 5. Type 1 bleed would be considered good, Type 2 fair, and Types 3, 4 and 5 from poor to very poor.

The type of diisocyanate which is used in the practice of this invention has been found to have a pronounced effect on the nature of the product, but each diisocyanate has been found to modify the nature of the product to some degree so that the resultant can be adapted to certain uses. Oftentimes, different isomers will unpredictably give different results. These differences in results will be pointed out more specifically in the examples which will follow at the end of this part.

From one to ten percent of diisocyanate can be reacted with the oxidized microcrystalline wax to give a markedly improved product. The preferred concentration of diisocyanate is from three to six percent. It has been found that the penetration of the product will gradually increase, quite pronounced at first, as the percentage of diisocyanate is increased; however, with higher percentages of diisocyanate, some incompatability is encountered. It is also observed that, at first, the oil retention penetration is lowered (the oil-wax blend is hardened), and as high percentages of diisocyanate are used (6 or 8 or higher percent) the oil retention penetration starts to increase. When insolubility is encountered it can oftentimes be lessened or eliminated by either rapid stirring or by adding the diisocyanate at a slower rate. The ratio of reactants can be within the range of 92-98% of the hard fraction of wax and 8-2% of the polyisocyanate.

The reaction time and the reaction temperature also have an effect on the nature of the product. The preferred reaction time is from one to eight hours. The most pronounced changes in the nature of the product occur during the first hour or two and then there is a gradual improvement in some of the properties, i.e., penetration and oil retention penetration; and there may be a slight reduction in the dispersing ability of the product as the reaction time is prolonged. These reactions are normally carried out at temperatures just above the melting point of the wax on up to 140° C. and higher. It is preferable to carry out the reaction at lower temperatures so as to obtain products of lighter color and other slightly improved properties. Little discoloration of the solvent extracted oxidized wax is obtained when it is reacted with diisocyanate at 90° C. but it is preferred to carry out the reaction at slightly higher temperatures for the sake of convenience.

In my co-pending application, Serial No. 612,946, filed October 1, 1956, it was observed that, in the case where oxidized waxes without solvent extraction were reacted with diisocyanates, the addition of water to the reaction mixture at the beginning of the reaction had a most pronounced effect on the nature of the product in many instances. Concentrations of water as low as 0.05% materially affected the course of the reaction and, sometimes, concentrations up to 1% of water were used. The preferred water concentration was from 0.05 to 0.3. In many instances, it was not necessary to add any water to the reaction mixture and the reaction was carried out under substantially anhydrous conditions. In this latter case, that may not have been the real story, for when an oxidized wax is heated up there is always the chance that water may be formed by dehydration, esterification, or the like. If too much water was used, it was noticed that some insolubility was encountered in the final product, particularly in the solid state, but normally the products were homogeneous in the liquid state. It was not exactly understood whether the water acted as a catalyst or a reactcant, or both, but it was felt that, at least to a certain extent, it was a reactant. It was found that, as the concentration of water was increased, up to a certain point, there was a gradual improvement in such properties; such as, oil retention penetration and oil retention.

In the present invention, when a solvent extracted oxidized microcrystalline wax is used, it was noted that in some cases the addition of water had no apparent effect on the nature of the product and it seems that identical products are obtained, whether water is used or not. In cases where water had an effect on the reaction, the effect was, in general, not as great as was observed in the just-mentioned co-pending application. The reason for this difference is not clearly understood. It is questionable whether water is always necessary for this reaction for, although the solvent extracted wax contains little or no water, there is always the possibility that some water is generated during the reaction of the wax with the diisocyanate through dehydration, esterification, or other reactions. It is not known whether this water is essential to the reaction, but it is noteworthy that the addition of external water (i.e., 0.2% water) seems to have no adverse effect as far as is known on the nature of the product when higher percentages of diisocyanate were used, along with added water, there was some evidence of insolubility in the resultant product (i.e., the product appeared cloudy).

Investigation of additives other than water or in conjunction with water was pursued using materials in small concentrations such as urea, ammonium hydroxide, hydrochloric acid, hydrogen peroxide, hydrogen sulfide, ethylene diamine, ethanolamine, paraformaldehyde, and similar low molecular weight compounds containing active hydrogens. When these materials were added, useful products were obtained in many instances. It has been found that when trace quantities (i.e., 0.05-0.3%) of ethylenediamine or ethanolamine, or related materials are added at the beginning of the reaction a more homogeneous or, in many cases, a completely homogeneous product is obtained when normally heterogeneous products are obtained (i.e., when larger quantities of diisocyanate and/or water are used).

It is also possible to react the diisocyanate with glycols such as ethylene glycol, propylene glycol, triethylene glycol, tetraethylene glycol, butylene glycol, and higher homologues and similar type compounds; diethylene glycol, dipropylene glycol, dibutylene glycol, and higher molecular weight compounds of this general type, analogous amine and amine alcohol type compounds; and, other polyhydric and/or polyamines. It is best to use an excess of a diisocyanate so that the resultant will have free isocyanate groups. These resultants can then be reacted with solvent extracted oxidized waxes to yield improved products, but these findings are not part of the instant invention.

The nature of the solvent extracted microcrystalline wax has an influence on the nature of the product. However, regardless of which solvent extracted oxidized wax is used, there is a pronounced improvement in the hardness and other properties of the wax.

The reaction mechanism encountered when an oxidized wax is reacted with a diisocyanate is not fully understood, but it is known that when an isocyanate is reacted with an alcohol, a urethane is formed; when it reacts with a carboxylic acid an amide plus carbon dioxide is formed; when it reacts with an active methylene compound an amide is formed; and when it reacts with water an amine plus carbon dioxide is formed, and the resulting amine may react with another molecule of isocyanate to form a substituted urea. In general, an isocyanate will react with an amine in preference to water, with water in preference to an alcohol; with an alcohol in preference to a carboxylic acid, and with a carboxylic acid in preference to an active methylene group. Under certain conditions, isocyanates will also polymerize, act as dehydrating agents, etc.

When a solvent extracted microcrystalline wax is reacted with a diisocyanate the isocyanate will presumably react with the active centers in the wax such as the alcohols and acids. If there is any water present or evolved through dehydation, etc., the isocyanate will react with it first to yield an amine which would then react with a second diisocyanate to yield a disubstituted urea containing two isocyanate groups. This, in turn, would then react wtih active centers in the wax to yield urethanes, amides, etc. If more water is present (i.e., several tenths or more percent) the disubstituted urea containing two isocyanate groups may react further with water (which is more reactive than the active groups in the oxidized wax) to give longer chain molecules and, as a result, in some instances, insolubility in the finished material. This discussion of the reaction mechanism is somewhat speculative. However, it is felt that such presentation represents at least to a partial extent an explanation of what actually occurs, and gives some indication of the underlying rationale of the reactions involved.

It is not clearly understood why, when for example a certain solvent extracted microcrystalline wax is reacted with 0.2% of water and 4% of tolylenediisocyanate, the same product is apparently obtained as is formed when no water is added. It may be that chemically there is some difference as described in the above paragraph, but that physically the two products test the same. It is interesting that when the lower melting softer fraction (the more undesirable fraction) from the solvent extraction step is reacted with a diisocyanate, the addition of water does seem to effect the oil retention penetration, although there is little effect on the other tested properties. It is noteworthy that in cases where water has an effect on the nature of the product, the oil retention penetration is the thing that is affected to a large extent, whereas the other tested properties of the resultant are changed only slightly.

When a solvent extracted oxidized microcrystalline wax is reacted with a diisocyanate, there is a marked unpredictable improvement in certain of the properties of the product. As far as is known, no one has been able to desirably improve any or a combination of several properties of a solvent extracted oxidized wax by adding or reacting the latter with small percentages of one or more heretofore employed reactants. In most instances, the improvements which have been achieved by use of the present process cannot be accomplished, even when as much as 10, 15 or 20% of some other material or compound is allowed to react with an oxidized or solvent extracted oxidized wax. By the procedure of this invention, it has been possible to obtain a great improvement in the hardness of the wax, for example, an improvement in penetration of from 3 to ½; also, to achieve a reduction in the oil retention penetration of from greater than 150 to 40 and even less. In addition, most of the products of this invention show excellent oil retention and also have the ability to disperse carbon to a better extent than the original solvent extracted oxidized microcrystalline wax or even the natural waxes such as carnauba and ocuricury. For many purposes, with these improvements in the solvent extracted oxidized wax with a diisocyanate, it is possible to produce a synthetic wax which has all or most of the desirable characteristics of carnauba and ouricury for many applications and, in some characteristics, superior to the latter two waxes. Particular reference is made to a wax which may be used in various carbon paper ink formulations which will be described later.

Although the products obtained according to my co-pending application, Serial No. 612,946, filed October 1, 1956, are much superior to the original oxidized waxes and, in many cases, are fairly comparably to carnauba and ouricury in many of their applications, the waxes produced according to the present invention show great improvement over these, especially in regard to their hardness, by themselves or with oil, and their ability to hold the oil. In these respects in particular, and also their ability to disperse carbon, they are the equal to and in certain regards superior to carnauba and ouricury and they can serve as complete replacements for these waxes. The use of a solvent extracted oxidized microcrystalline wax rather than the oxidized hydrocarbon wax represents an improvement on my co-pending application just referred to.

The following examples will illustrate more specifically what has been stated above. These reactions, characteristic of the present process, were carried out by first melting 300 grams of wax in a glass reaction vessel. The temperature was held at 5° C. below the reaction temperature; for instance, 90° C. to 140° C., and if water was added, it was added at this point and then the diisocyanate was added rapidly. Normally, there was an exothermic reaction and the temperature rose 3 to 5° C. The reaction mixture, during the course of the reaction, was mechanically agitated with a metal stirrer. The following table illustrates the effect of many of the reaction variables and describes in greater detail what has been said above.

TABLE I.—REACTANTS AND REACTION CONDITIONS

| Example No. | Wax from Ex. No. | Diisocyanate | Percent Diisocyanate | Percent Water | Reaction Temperature | Reaction Time, hrs. |
|---|---|---|---|---|---|---|
| 1c | 1b—ins | TDI | 3 | 0.1 | 115 | 6 |
| 2c | 1b—ins | TDI | 5 | 0.1 | 115 | 6 |
| 3c | 2b—ins | TDI | 4 | | 115 | 6 |
| 4c | 2b—ins | TDI | 4 | 0.2 | 115 | 6 |
| 5c | 3b—ins | TDI | 4 | | 115 | 6 |
| 6c | 3b—ins | TDI | 4 | 0.2 | 115 | 6 |
| 7c | 4b—ins | TDI | 4 | | 115 | 6 |
| 8c | 4b—ins | TDI | 4 | 0.2 | 115 | 6 |
| 9c | 4b—ins | TDI | 6 | 0.2 | 115 | 6 |
| 10c | 4b—ins | TDI | 2 | | 115 | 6 |
| 11c | 4b—ins | TDI | 8 | | 115 | 6 |
| 12c | 4b—ins | TDI | 4 | | 115 | 3 |
| 13c | 4b—ins | TDI | 4 | | 95 | 6 |
| 14c | 4b—ins | TDI | 4 | | 140 | 6 |
| 15c | 4b—ins | MDI | 4 | | 115 | 6 |
| 16c | 4b—ins | TDII | 4 | | 115 | 6 |
| 17c | 4b—ins | NDI | 4.7 | | 115 | 6 |
| 18c | 4b—ins | HMDI | 3.4 | | 115 | 6 |
| 19c | 4b—sol | TDI | 4 | | 115 | 6 |
| 20c | 4b—sol | TDI | 4 | 0.2 | 115 | 6 |
| 21c | 5b—ins | TDI | 4 | | 115 | 6 |
| 22c | 5b—ins | TDI | 4 | 0.2 | 115 | 6 |

Notes:
"Ins." is an abbreviation for insoluble and indicates that the solvent insoluble oxidized wax fraction from the indicated example is used.
"Sol." is an abbreviation for soluble and indicates that the solvent soluble oxidized wax fraction from the indicated example is used. (Example numbers 19c and 20c.)

PRODUCTS

| Example No. | S.P. (°F.) | Penetration, 100/5 @ 77° F. | Acid No. | Oil Retention | Oil Retention Penetration | Carbon Dispersion @ 6% |
|---|---|---|---|---|---|---|
| 1c | 189 | 1− | 10 | 1 | 48 | |
| 2c | 190 | 0+ | | 1 | 56 | |
| 3c | 190 | 1− | 11 | 1 | 47 | |
| 4c | 190 | 1− | | 1− | 35 | |
| 5c | 190 | 1+ | 11 | 1 | 49 | |
| 6c | 190 | 1+ | | 1 | 48 | |
| 7c | 189 | 1− | 15 | 1− | 38 | |
| 8c | 189 | 1− | | 1− | 38 | |
| 9c | 189 | ½ | | 1− | 46 | |
| 10c | 189 | 1− | | | 59 | |
| 11c | 190 | 1− | | 1− | 60 | |
| 12c | 189 | 1+ | | 1 | 49 | |
| 13c | 189 | 1+ | | 1− | 41 | |
| 14c | 189 | 1− | | 1+ | 42 | |
| 15c | 190 | 1+ | | 3 | 52 | |
| 16c | 190 | 1− | | 2 | 77 | |
| 17c | 190 | 1 | | 3 | 80 | |
| 18c | 188 | 1 | | 2 | 74 | |
| 19c | 151 | 17− | | | *86 | |
| 20c | 151 | 17+ | | | *95 | |
| 21c | 188 | 1+ | 20 | 3 | 49 | B |
| 22c | 188 | 1 | | 3+ | 32 | B |

*Since on a 50–50 wax oil mixture the oil retention penetration was so high, a mixture containing two-thirds wax and one-third oil was used. The resultant mixture was still so soft, the penetration was measured using a cone rather than a needle by the procedure outlined in the ASTM test method D937-47T.

The isocyanate TDI is tolylene-2,4-diisocyanate, sometimes referred to as toluene-2,4-diisocyanate or 1-methyl-phenylene-2,4-diisocyanate.

Isocyanate TDII is composed of a mixture of 65% tolylene-2,4-diisocyanate and 35% tolylene-2,6-diisocyanate.

Isocyanate MDI is diphenylmethane-4,4′-diisocyanate.
Isocyanate NDI is naphthylene-1,5-diisocyanate.
Isocyanate HMDI is hexamethylene diisocyanate.
The products described in the above examples do not necessarily have all the desired characteristics which would make them useful for all the formulations described in Parts 4 and 5, but with few exceptions they are very much superior to the oxidized or solvent extracted oxidized microcrystalline waxes from which they are made. One of the most striking improvements in the oxidized hydrocarbon waxes is that of penetration (hardness of the wax), oil retention penetration (hardness of a wax-oil mixture), oil retention (ability of the wax to hold oil without bleeding), and ability to disperse carbon black and other pigments. These waxes also appear more abrasion resistant and glossier than the precursor waxes and there is no noticeable change in emulsifiability.

In most cases, there seems to be some increase in the viscosity of the products over the starting wax, and in some cases there is a marked increase, especially when TDII is used. This can sometimes be partially alleviated by increasing the stirring rate.

The Table I examples illustrate the effect of varying the type of diisocyanate, the concentration of diisocyanate, the reaction temperature, the duration of reaction, and the effect of externally adding water on the nature of the product. They also show the results of using different solvent extracted microcrystalline waxes made from waxes oxidized to different extents and/or from using different solvents.

It is noticed from the table that the addition of water to the reaction mixture sometimes improves the oil retention penetration of the product, but, in general, when it is not needed it has no adverse effect unless larger quantities are used, i.e., around 0.5% water. When higher amounts are used, some insolubility is often encountered, especially when higher percentages of diisocyanate are used.

When water is used in the reaction rather than adding the water to the wax before the diisocyanate, it can be added afterwards, either all at once or in small increments. Also, it may be added by passing a stream of gas such as nitrogen saturated with water through the reaction mixture during the reaction.

Oftentimes, it is not necessary to add water for often there is sufficient water present in the wax. This water may be present in two forms, i.e., in the free state, or as water which can be generated during the reaction by dehydration of alcohols, esterification of free alcohols and acids, decomposition of peroxides, or by other means. An indication of the amount of free water in wax can easily be determined by a quick azeotropic distillation of the water in the wax with anhydrous benzene. An indication of the amount of water which can be generated during the reaction can be determined by using the same method but employing a higher boiling solvent such as toluene or xylene and allowing the distillation to proceed for about six hours. In general, there is found to be approximately 0.02–0.1% of free water in the wax and about an equal amount of which can be generated. For the purposes of this invention water is meant to include that which is present in the free state in the wax and that which is capable of being generated. By added water is means that water which is externally added before or during the reaction of the wax with diisocyanate. The wax can be reacted under fairly anhydrous conditions such as by dehydrating the wax by blowing it with a dry inert gas, by heating it under a vacuum, or by an azeotropic distillation. By reacting such produced waxes, excellent products are obtained for many applications such as emulsion polishes, but the main disadvantage of these products is that they oftentimes may have poorer oil retention penetrations (i.e., they produce softer wax-oil blends) and thus are inferior when used in paste polishes or in carbon paper inks. Because of the added work of removing trace amounts of water from the solvent extracted oxidized microcrystalline waxes, it is more economical to produce the products of this invention by leaving in the water; the water as far as is known having no deleterious effects on the products which are used for the various uses described in the next sections.

The reason why the addition of water to the reaction mixture has an effect on the nature of the product (especially in regard to the oil retention penetration) when certain waxes are used and no effect when others are employed is not clearly understood. Perhaps there are some certain low molecular weight oxygenated materials which are removed from the oxidized wax by the solvent in certain instances. With these materials removed the resultant solvent insoluble wax may test similarly whether the water is added or not even though they may be somewhat different chemically. This is highly speculative and there is some difference noted (see Examples 19c and 20c) when the solvent soluble fraction is reacted with TDI with and without added water, though the difference is small and in the wrong direction.

It is remarkable how poor the oil retention penetration is of the reaction product from the solvent soluble wax with TDI. It appears that the solvent fractionation is such that an insoluble fraction is obtained which gives an unpredictably good product, particularly in regard to oil retention penetration, and a solvent soluble portion which gives an unpredictably poor product.

By the solvent insoluble fraction is meant that part of the oxidized microcrystalline wax which is precipitated when the wax-solvent solution is cooled to the filtration temperature and the solvent soluble fraction represents that fraction of the oxidized wax which remains in solution at the filtration temperature, and which is recovered by removing the solvent.

Useful products may also be prepared in some cases by first reacting the diisocyanate with water and then reacting the resultant with the solvent extracted oxidized wax. The diisocyanate has been reacted with water by allowing a thin layer of the diisocyanate to remain in the atmosphere and react with the moisture in the air for several days. Also, the diisocyanate dissolved in a solvent such as benzene or heptane can be reacted with water in a closed container and the resultant can then be removed by filtration. The diisocyanate-water reaction product can then be added to the oxidized wax and the reaction continued as described above. By the use of these procedures it is generally necessary to filter the product to remove small amounts of insoluble material. By these methods, useful products can be obtained which show many of the advantages of the products previously described.

The following two parts will illustrate how the products of this part may be utilized for various applications.

PART 4

This part deals with the utilization of the products which are produced as described in Part 3 in carbon paper inks. There are several articles, patents, and other published literature which discuss various types of carbon paper, particularly in regard to formulation of the various ingredients, test procedures, utilization of various waxes, etc. See, for example, U.S. Patent No. 2,426,248, dated August 26, 1947, to Sugarman; chapter 12 entitled "Carbon Papers and Other Duplicating Papers" by R. R. Wissinger in the book edited by R. H. Mosher entitled "Specialty Papers," published by the Chemical Publishing Co., New York in 1950; the paper on the "Rheology of Carbon Paper Inks" by E. S. Gale and B. J. Staneslow in the American Ink Maker issue of December 1950; the paper on "Converting of Carbon Papers" by F. B. McFarland in the Paper Trade Journal, volume 137, pages 230–237 (1953); and the book Commercial Waxes by H. Bennett, pages 368, 377 and 429–431, published by Chemical Publishing Co., New York, in 1944.

There are many different types of carbon paper and related materials in use today. The three most widely used types of carbon paper are the one-time carbon which is used once and then thrown away, the pencil carbon which may also be used once, or may be used many times, and the typewriter carbon. The one-time carbon is the most widely used type of carbon paper and it finds wide application in business and multiple forms and other applications. In the production of one-time carbon paper, cost is all important. On the other hand, for typewriter carbons, quality rather than cost is important, and for pencil carbons, cost and quality are intermediate in importance.

The carbon paper ink may be viewed simply as a mixture containing a wax, an oil, a pigment and a dye. The oil serves as the vehicle and the pigment and dye give the color and some of the body. Most of the desirable characteristics in the finished ink must be supplied by the wax and these will be described later. Other materials may also be used in carbon paper to give it certain properties. For example, petrolatum may be used as part or all of the vehicle to impart certain properties such as plasticity and toughness, and paraffin wax may be used as a substitute for part of the wax to give a cheaper formulation. One of the unique properties of many of the waxes described in Part 3 of this invention is that they are able to carry a lot of paraffin wax into the ink formulation without detracting greatly from the desirable characteristics required. In this respect, these products are comparable to carnauba and ouricury and superior to Montan, and the precursor oxidized hydrocarbon material. Other materials may be used in carbon paper inks such as clay to cheapen the formula, oleic acid which acts as a dye solubilizer, rubbers to give toughness, dispersing agents, etc.

The consistency and other properties of the ink can be varied to a certain degree by the choice of the oil which is used. For example, various oils ranging from a relatively light mineral oil (100 SUS at 100° F.) up to heavy oils and petrolatums may be used. These oils and petrolatums may be colorless or range in color up to black. The darker colored materials are generally better dispersants for the pigment.

There are numerous pigments which may be used in typical formulations. The most common pigment is carbon black and this comes in numerous grades such as channel blacks, furnace blacks, etc., and each of these grades come in many modifications. The channel blacks are, in general, the most desirable as far as quality is concerned, but on the other hand, they are also the most expensive. The high-grade channel blacks have an oxygenated surface which aids in its dispersion and which can absorb the dye and other materials. As one goes down the scale of carbon blacks, lesser amounts of this very desirable oxygenated surface are encountered. Blue pigments may also be used, such as milori blue, and others, as can many other blue pigments. Numerous other colored pigments may also be used as described in the literature.

Many dyes are commonly employed in carbon paper inks. The common ones are methyl violet, nigrosine, Victoria blue, etc., and salts of these materials. It is advantageous to use a dye which is soluble in the wax, but if this is impossible, a solubilizer must be used. One of the advantages of using products of this invention is that the dye is soluble in the wax and no solubilizer is necessary. In general, any solubilizer, which is used will detract from the qualities of the finished ink, i.e., will cause dye bleed, soften the ink, cause frosting, etc. In some instances it is possible to completely eliminate the dye, but this is the exception rather than the rule.

A wax, to be useful for this purpose, must have many specific properties when used in small concentration in the finished ink; for example, in concentrations of from 8% to 12% in one-time carbon paper inks, or in higher percentages, up to 30% or 40%, in typewriter carbons.

It seems that most of the desirable characteristics required in a one-time carbon paper ink must be imparted by small percentages of wax. This is particularly true of one-time carbon paper inks. Since these waxes must have so many specific characteristics, which seem to be specific for only carnauba and ouricury wax, it is not surprising that these two natural waxes are widely used as one of the components of carbon paper inks, and that there are no synthetic materials which can completely replace these materials in the percentages in which they are used. It was quite surprising that many of the products described in Part 3 of this invention had a combination of all the desirable characteristics required and that the materials served as complete replacements for the expensive natural waxes, carnauba and ouricury in many applications and in some respects these waxes are actually superior to the two natural waxes.

To be useful for carbon paper inks a wax must be able to dissolve the dye, such as methyl violet, Victoria blue, nigrosine, etc., preferably without the addition of a solubilizer, such as oleic acid. In this respect, the waxes of this invention are much superior to the natural waxes carnauba, ouricury, and montan which are almost universally used in one-time carbons. A wax must also produce good flow in a one-time carbon paper ink so that a thin uniform coating can be obtained. To produce good flow, a wax should give an ink of low viscosity, no thixotropy and no yield value (be Newtonian). The dispersion of the carbon black and the viscosity of the wax are the important variables which influence the flow of the finished ink. The ability of a wax to disperse carbon can be measured by the procedure described by Gale and Staneslow in the aforementioned article. If a wax gives B-type dispersion or better, at 6%, no flow difficulties would be expected. Also, in this respect, many of the products of this invention are equal to or superior to the natural waxes ouricury, carnauba and montan, and as a group far better than the starting oxidized or solvent extracted oxidized microcrystalline waxes.

A wax must also yield a finished ink which is hard and which will not bleed oil. These properties can be easily tested, at least to a certain degree, by determining the oil retention penetration and the oil retention of a wax oil blend. In this respect, the waxes of this invention show great value and are comparable, in some cases superior, to carnauba, ouricury and montan. This is the one property which in the past has been so hard to duplicate.

It was quite unpredictable that, when a solvent extracted microcrystalline wax is reacted with a diisocyanate, a new material could be formed which had a combination of all the desirable properties which are necessary for a carbon paper ink. Following is a formulation employing waxes of this invention for a one-time carbon of medium intensity:

| Grams | Material |
| --- | --- |
| 12 | Product of Example No. 7c. |
| 20 | Paraffin Wax (M.P. approx. 135° F.). |
| 17 | Carbon Black. |
| 1 | Methyl Violet. |
| 50 | Mineral Oil. |

The paraffin wax used is a high-melting-point paraffin and the oil is a 100-second oil at 100° F. The carbon black can be a channel black such as exemplified by Peerless Beads or a cheaper channel black such as Raven 15, manufactured by Columbian Carbon Company, or a furnace black as exemplified by Statex B-12 manufactured by Columbian Carbon Company. Considering cost and the properties of the finished ink, the best of the above blacks is Raven 15.

The formula is similar to that described in my co-pending application, Serial No. 612,946, filed October 1, 1956, but it has been found that by the use of the products of this invention that the finished ink is harder and less oil and dye bleed is obtained on aging.

The same improvement is likewise noted in other formulations which are described in this part. The waxes of this invention show their greatest superiority in comparison to those in my co-pending application just referred to in respect to the hardness of the finished ink and in their ability to lessen or eliminate oil and dye bleed.

The above formulation may be modified in several ways to give different intensities and grades of ink; for example clay can be substituted for some of the carbon black and oil to cheapen the formula without greatly impairing quality, and other variations in the proportions of wax may be made.

A similar one-time carbon paper formulation employing clay is as follows:

| Grams | Material |
|---|---|
| 12 | Product of Example No. 8c. |
| 25 | Paraffin Wax (M.P. approx. 135° F.). |
| 0.5 | Methyl Violet Hydrochloride. |
| 1 | Nigrosine base. |
| 18 | ASP-100 clay. |
| 10 | Carbon Black. |
| 17 | 300 Sec. Mineral Oil. |
| 16.5 | Petrolatum. |

One type of carbon black which may be used is a channel black such as Peerless Beads or a cheaper channel black such as Raven 15 or comparable products, or mixtures of these. These waxes also find use in other types of carbon paper and ribbons such as pencil carbons, typewriter ribbons, etc. A typical one-time medium blue pencil carbon formulation is as follows:

| Grams | Material |
|---|---|
| 12 | Product of Example No. 22c. |
| 25 | Paraffin Wax (M.P. approx. 135° F.). |
| 18 | ASP-100 clay. |
| 20 | Milori blue. |
| 13 | 300 sec. Mineral Oil. |
| 12 | Petrolatum. |

A typical typewriter formulation is as follows:

| Grams | Material |
|---|---|
| 25 | Product of Example No. 5c. |
| 18 | Carbon black ("Raven 15"). |
| 1 | Methyl Violet. |
| 10 | Paraffin Wax (M.P. approx. 135° F.). |
| 16 | 300 sec. Mineral Oil. |
| 30 | Petrolatum. |

As above, this formulation may be modified in many ways to obtain carbon paper ink to fit individual uses.

In the above formulations, if any of the waxes of this invention are substituted by the products of Examples 1a through 3a, or Examples 1b through 5b, inferior inks will always be obtained. These formulations show that when the precursor or the solvent extracted oxidized microcrystalline wax is modified by a diisocyanate as described in Part 3, a product is formed which is far superior to the precursor wax. If, in any of the above formulations, an oxidized or solvent extracted oxidized microcrystalline wax is used rather than the products of this invention, an ink is obtained which will yield inks which are softer, more viscous (probably because of insufficient dispersion of the pigment), and tackier. These inks will also exhibit oil bleed and dye bleed and the finished carbon paper will be subject to smudging. It is quite unexpected that these precursor oxidized materials could be modified by the reaction with small quantities of diisocyanate to yield products which have the desirable characteristics which are required for a wax to be used in carbon paper inks.

These inks may be prepared either in a ball mill or a three-roll mill by conventional procedures using temperatures of from approximately 190° F. to 220° F. Care must be taken when certain dyes are used not to exceed these temperatures; otherwise, the dye will decompose. These finished inks can be coated onto paper using a Mayer type coater or comparable equipment. Normally, it is best to apply approximately 2.5 lbs. of wax per ream for one-time carbons and higher quantities for typewriter carbons.

PART 5

This part deals with other uses of the reaction products which are produced as described in Part 3.

Because of the very desirable properties, particularly in reference to the excellent hardness of the products in this invention, they are useful for blending with other materials to impart their favorable properties, for example; they may be blended in small concentrations with paraffinic type waxes to yield blends with improved hardness and increased melting point. One specific application in this line would be to blend 3–10% of the hard products described in the examples in Part 3 of this application with paraffin wax to yield a product with better blocking characteristics.

These materials are also useful as corrosion inhibitors, probably because of the fact that they contain high molecular weight carboxylic acids. This is a use which is based on the chemical nature of the product rather than its physical characteristics.

One of the important uses for the products described in Part 3 is for various types of polishes; for instance, floor polish, shoe polish, furniture polish, and automobile polish.

A typical formulation in which these products have found use in the field of emulsion floor polishes is as follows:

| Grams | Material |
|---|---|
| 50 | Product of Example No. 13c. |
| 50 | "Durez 219". |
| 10 | Oleic Acid. |
| 6 | 2-amino-2-methyl-1-propanol. |
| 4 | Borax. |
| 830 | Water. |

The first three ingredients in the above formulation are blended at temperatures up to but not exceeding 350° F. The mixture is cooled to 210° F. with agitation. The 2-amino-2-methyl-1-propanol is added with stirring at 200 to 210° F. followed immediately by the borax in a saturated solution. The resulting mixture is heated with stirring at 200° F. to a maximum of 210° F. for five minutes and then the wax melt is slowly poured into water at 200° F. with rapid agitation. When the emulsion has smoothed out, 10–20% of a cold solution of leveling agent is added during agitation and cooled to room temperature. A leveling agent which may be used is a 12% ammoniacal shellac solution prepared by dissolving 102 g. of refined dewaxed shellac in a solution of 26 g. of 26° Bé. (28%) ammonia in 722 g. of water.

"Durez 219" is a terpene-phenolic, oil soluble, high melting, low viscosity, thermoplastic resin having a melting point (capillary) of 130–136° C., and acid number of from 60 to 70, a specific gravity at 25° C. of 1.09 and a refractive index of 1.552. It is manufactured and supplied by the Durez Plastic and Chemicals Division of Hooker Electrochemical Co.

Many modifications of the above formulation can be made; for instance, the resin can be eliminated or other resins substituted for the above. Other waxes can be used in conjunction with the above or the products of the other examples in this invention can be used.

The above polish formulation, when spread on linoleum, asphalt tile, rubber tile, vinyl tile, etc., yields a film which when dried, is very hard, scuff- and abrasion-resistant with a high gloss and with good water resistance, and each of these properties is superior to that obtainable using the starting oxidized microcrystalline wax. The resulting wax film is harder and more scuff resistant than obtainable by the products of my copending application, Serial Number 612,946, dated October 1, 1956.

A good no-rub automobile polish and furniture polish can be prepared from the following formulations and procedures:

AUTOMOBILE POLISH

| Grams | Material |
|---|---|
| 3.0 | Product of Example No. 22c. |
| 3.6 | Silicone (5000 cs. visc.). |
| 3.6 | Oleic Acid. |
| 1.7 | Morpholine. |
| 67.5 | Mineral Spirits (boiling point 275–325° F.). |
| 40.0 | Water. |

The wax, silicone and oleic acid are dissolved in the mineral spirits. From this beginning the emulsion may be formed by the wax to water technique as outlined under the emulsion polish procedure. A suitable 5000 cs. viscosity silicone would be Linde L–41 diethyl silicone oil sold by Linde Air Products Co., Division of Union Carbide and Carbon Corporation.

These last two formulas make good high-gloss polishes of the no-rub, quick-drying type. Most silicone polishes require thorough cleaning of the surface of application for best results. With clean surfaces the polish is spread smoothly, allowed to dry to a powdery film and the film wiped off, leaving a high gloss with no rubbing.

The ratio of silicone to wax should be maintained while the variation in the total solids (wax in silicone) is between four and ten percent.

Following is a formulation for the manufacture of a shoe polish wax employing a wax of this invention:

SHOE POLISH

| Grams | Material |
|---|---|
| 12 | Paraffin Wax (131–133° F.). |
| 13 | Product of Example No. 9c. |
| 15 | Turpentine. |
| 60 | Mineral Spirits. |

The first two ingredients are melted together and to this blend the last two materials are added. After a solution is obtained, the polish is poured at a temperature just above the point in which the wax starts to separate. Depending upon the color of the finished product, any of several dyes may be used, the main criterion being that of solubility.

In any of these formulations, oftentimes other products from this invention other than those specifically mentioned may be used, but generally in these cases, slight modifications may become necessary. These modifications can be made without too much difficulty by those who are skilled in the art. The above formulations are very good starting points and these formulas can be altered or modified in any of many ways.

Attention should be directed to co-pending application, Serial Number 612,946, filed October 1, 1956.

Having thus described my invention, what I claim as new and desire to secure by Letters Patent, is:

1. The process which comprises reacting (A) the harder fraction of a solvent extracted oxidized tank bottom-derived microcrystalline wax having an acid number of at least about 15 prior to extraction, and (B) an organic compound containing as the sole reacting groups a plurality of separate and distinct groups selected from the group consisting of isocyanate and thioisocyanate groups; the ratio of reactants being within the range of 92–98% (A), and 8–2% (B), conducted at temperatures within the range of the melting point of the harder fraction of the oxidized hydrocarbon mixture to 150° C. for at least about one hour.

2. The process which comprises reacting (A) the harder fraction of a solvent extracted oxidized microcrystalline wax having an acid number of at least about 15 prior to extraction, (a) said wax being derived from a tank bottom-derived microcrystalline wax; (b) said microcrystalline wax being oxidized by means of an oxygen containing gas to an acid number of about at least 15, and (c) said oxidized microcrystalline wax being extracted by a procedure involving the steps of (aa) mixing the crude oxidized microcrystalline wax with an organic solvent under conditions of temperature and pressure wherein the initial state is soluble to an extent of at least 95% by weight; (bb) subsequently lowering the temperature so as to separate an insoluble harder fraction; and (cc) separating such precipitated harder fraction of oxidized microcrystalline wax from the solvent solution; and (B) an organic compound containing as the sole reacting groups a plurality of separate and distinct groups selected from the group consisting of isocyanate and thioisocyanate radicals; the ratio of reactants being within the range of 92–98% (A) and 8–2% (B), said reaction being conducted at temperatures within the range of the melting point of the harder fraction to 150° C. for at least about one hour.

3. The process of claim 2 with the proviso that (B) is a polyisocyanate.

4. The process of claim 3 with the proviso that (B) is a diisocyanate.

5. The process of claim 4 with the proviso that (a) has an average molecular weight within the range of 600 to 1000.

6. The process of claim 5 with the proviso that in (b) said microcrystalline wax is oxidized in the presence of an oxidation promoting catalyst so as to result in a saponification number of not less than 40.

7. The process of claim 6 with the proviso that in (b) the saponification number is within the range of 40–150 and the acid number within the range of 20–60.

8. The process of claim 7 with the proviso that in (aa) the organic solvent has a boiling point of not over 150° C. but greater than 50° C.

9. The process of claim 8 with the proviso that in (aa) the ratio of solvent to oxidized microcrystalline wax is within the range of 20:1 to 4:1 by volume.

10. The process of claim 9 with the proviso that in (bb) the insoluble phase represents ½ to ¾ of the initial oxidized microcrystalline wax.

11. The process of claim 10 with the proviso that said reaction be conducted in the presence of at least one mole of water to 10 moles of (B) but less than one mole of water to one mole of (B).

12. The process of claim 10 with the proviso that (B) is an aromatic diisocyanate.

13. The process of claim 12 with the proviso that in (aa) the organic solvent is a hydrocarbon.

14. The process of claim 13 with the proviso that in (aa) the hydrocarbon solvent contains five to nine carbon atoms.

15. The process of claim 14 with the proviso that said reaction be conducted in the presence of at least one mole of water to 10 moles of (B) but less than one mole of water to one mole of (B).

16. The process of claim 15 with the proviso that the ratio of reactants being within the range of 97%–94% (A) and 3–6% (B).

17. The process of claim 16 with the proviso that (B) is tolylene-2,4-diisocyanate.

18. The process of claim 16 with the proviso that (B) is 4,4′-diphenylenemethane diisocyanate.

19. The process of claim 14 with the proviso that (B) is tolylene-2,4-diisocyanate.

20. The process of claim 17 with the proviso that in (aa) the hydrocarbon solvent is hexane.

21. The process of claim 19 with the proviso that in (aa) the hydrocarbon solvent is hexane.

22. The process of claim 20 with the proviso that at least part of the water is externally added.

23. The product obtained by the process described in claim 1.

24. The product obtained by the process described in claim 2.

25. The product obtained by the process described in claim 3.

26. The product obtained by the process described in claim 4.

27. The product obtained by the process described in claim 5.

28. The product obtained by the process described in claim 6.

29. The product obtained by the process described in claim 7.

30. The product obtained by the process described in claim 8.

31. The product obtained by the process described in claim 9.

32. The product obtained by the process described in claim 10.

33. The product obtained by the process described in claim 11.

34. The product obtained by the process described in claim 12.

35. The product obtained by the process described in claim 13.

36. The product obtained by the process described in claim 14.

37. The product obtained by the process described in claim 15.

38. The product obtained by the process described in claim 16.

39. The product obtained by the process described in claim 17.

40. The product obtained by the process described in claim 18.

41. The product obtained by the process described in claim 19.

42. The product obtained by the process described in claim 20.

43. The product obtained by the process described in claim 21.

44. The product obtained by the process described in claim 22.

45. In the manufacture of carbon paper inks the step of intermixing the product defined in claim 23 with a coloring material and a vehicle.

46. In the manufacture of carbon paper inks the step of intermixing the product defined in claim 24 with a coloring material and a vehicle.

47. In the manufacture of carbon paper inks the step of intermixing the product defined in claim 25 with a coloring material and a vehicle.

48. In the manufacture of carbon paper inks the step of intermixing the product defined in claim 26 with a coloring material and a vehicle.

49. In the manufacture of carbon paper inks the step of intermixing the product defined in claim 27 with a coloring material and a vehicle.

50. In the manufacture of carbon paper inks the step of intermixing the product defined in claim 28 with a coloring material and a vehicle.

51. In the manufacture of carbon paper inks the step of intermixing the product defined in claim 29 with a coloring material and a vehicle.

52. In the manufacture of carbon paper inks the step of intermixing the product defined in claim 30 with a coloring material and a vehicle.

53. In the manufacture of carbon paper inks the step of intermixing the product defined in claim 31 with a coloring material and a vehicle.

54. In the manufacture of carbon paper inks the step of intermixing the product defined in claim 32 with a coloring material and a vehicle.

55. In the manufacture of carbon paper inks the step of intermixing the product defined in claim 33 with a coloring material and a vehicle.

56. In the manufacture of carbon paper inks the step of intermixing the product defined in claim 34 with a coloring material and a vehicle.

57. In the manufacture of carbon paper inks the step of intermixing the product defined in claim 35 with a coloring material and a vehicle.

58. In the manufacture of carbon paper inks the step of intermixing the product defined in claim 36 with a coloring material and a vehicle.

59. In the manufacture of carbon paper inks the step of intermixing the product defined in claim 37 with a coloring material and a vehicle.

60. In the manufacture of carbon paper inks the step of intermixing the product defined in claim 38 with a coloring material and a vehicle.

61. In the manufacture of carbon paper inks the step of intermixing the product defined in claim 39 with a coloring material and a vehicle.

62. In the manufacture of carbon paper inks the step of intermixing the product defined in claim 40 with a coloring material and a vehicle.

63. In the manufacture of carbon paper inks the step of intermixing the product defined in claim 41 with a coloring material and a vehicle.

64. In the manufacture of carbon paper inks the step of intermixing the product defined in claim 42 with a coloring material and a vehicle.

65. In the manufacture of carbon paper inks the step of intermixing the product defined in claim 43 with a coloring material and a vehicle.

66. In the manufacture of carbon paper inks the step of intermixing the product defined in claim 44 with a coloring material and a vehicle.

67. A carbon paper ink composition containing the product defined in claim 23 with a coloring agent and a vehicle.

68. A carbon paper ink composition containing the product defined in claim 24 with a coloring agent and a vehicle.

69. A carbon paper ink composition containing the product defined in claim 25 with a coloring agent and a vehicle.

70. A carbon paper ink composition containing the product defined in claim 26 with a coloring agent and a vehicle.

71. A carbon paper ink composition containing the product defined in claim 27 with a coloring agent and a vehicle.

72. A carbon paper ink composition containing the product defined in claim 28 with a coloring agent and a vehicle.

73. A carbon paper ink composition containing the product defined in claim 29 with a coloring agent and a vehicle.

74. A carbon paper ink composition containing the product defined in claim 30 with a coloring agent and a vehicle.

75. A carbon paper ink composition containing the product defined in claim 31 with a coloring agent and a vehicle.

76. A carbon paper ink composition containing the product defined in claim 32 with a coloring agent and a vehicle.

77. A carbon paper ink composition containing the product defined in claim 33 with a coloring agent and a vehicle.

78. A carbon paper ink composition containing the product defined in claim 34 with a coloring agent and a vehicle.

79. A carbon paper ink composition containing the product defined in claim 35 with a coloring agent and a vehicle.

80. A carbon paper ink composition containing the product defined in claim 36 with a coloring agent and a vehicle.

81. A carbon paper ink composition containing the product defined in claim 37 with a coloring agent and a vehicle.

82. A carbon paper ink composition containing the product defined in claim 38 with a coloring agent and a vehicle.

83. A carbon paper ink composition containing the product defined in claim 39 with a coloring agent and a vehicle.

84. A carbon paper ink composition containing the product defined in claim 40 with a coloring agent and a vehicle.

85. A carbon paper ink composition containing the product defined in claim 41 with a coloring agent and a vehicle.

86. A carbon paper ink composition containing the product defined in claim 42 with a coloring agent and a vehicle.

87. A carbon paper ink composition containing the product defined in claim 43 with a coloring agent and a vehicle.

88. A carbon paper ink composition containing the product defined in claim 44 with a coloring agent and a vehicle.

References Cited in the file of this patent

UNITED STATES PATENTS

| | | |
|---|---|---|
| 2,123,186 | Epstein et al. | July 12, 1938 |
| 2,319,057 | Hanford | May 11, 1943 |
| 2,326,501 | Siefken et al. | Aug. 10, 1943 |
| 2,426,248 | Sugarman | Aug. 26, 1944 |
| 2,358,475 | Pratt et al. | Sept. 19, 1944 |
| 2,430,479 | Pratt et al. | Nov. 11, 1947 |
| 2,680,759 | Otto | June 8, 1954 |
| 2,698,336 | Nelson | Dec. 28, 1954 |
| 2,700,050 | Riethof et al. | Jan. 18, 1955 |
| 2,779,779 | Meyers et al. | Jan. 29, 1957 |
| 2,794,040 | Annable et al. | May 28, 1957 |

FOREIGN PATENTS

| | | |
|---|---|---|
| 885,875 | France | Sept. 28, 1953 |
| 1,092,695 | France | Apr. 26, 1955 |